(12) United States Patent
Hatakeyama

(10) Patent No.: US 7,095,437 B1
(45) Date of Patent: Aug. 22, 2006

(54) ELECTRONIC CAMERA

(75) Inventor: Kouki Hatakeyama, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/316,033

(22) Filed: May 21, 1999

(30) Foreign Application Priority Data

May 25, 1998 (JP) ................................ 10-143163

(51) Int. Cl.
*H04N 5/76* (2006.01)
(52) U.S. Cl. ................................ 348/231.7; 348/231.9
(58) Field of Classification Search .............. 348/231.8
See application file for complete search history.

(56) References Cited

U.S. PATENT DOCUMENTS

| 4,717,961 A | * | 1/1988 | Miyake et al. ............ 348/231.9 |
| 5,091,787 A | * | 2/1992 | Watanabe et al. ......... 348/231.9 |
| 5,179,505 A | * | 1/1993 | Matsuo ........................ 361/754 |
| 5,423,045 A | * | 6/1995 | Kannan et al. ............. 713/322 |
| 5,805,219 A | * | 9/1998 | Ejima et al. ................ 348/375 |
| 6,542,186 B1 | * | 4/2003 | Uryu ........................ 348/231.7 |

FOREIGN PATENT DOCUMENTS

| JP | 02077815 A | * | 3/1990 |
| JP | 03186073 A | * | 8/1991 |
| JP | 0896493 |   | 4/1996 |

OTHER PUBLICATIONS

Machine assisted translation of JP 08-096493 to Maeda.*

* cited by examiner

*Primary Examiner*—David Ometz
*Assistant Examiner*—Yogesh Aggarwal
(74) *Attorney, Agent, or Firm*—Birch Stewart Kolasch & Birch, LLP

(57) ABSTRACT

An electronic camera automatically suspends the power supply when an external storage medium is detached, and automatically resumes the power supply when the external storage medium is attached. This eliminates the necessity of operating a power switch when the external storage medium is detached and attached. The power supply to a memory card interface and a memory card is suspended upon detection of the start of the detachment of the memory card while the main switch is ON. This protects the memory card and data therein, and reduces the waste of power in the camera while the memory card is detached from the camera. The power supply is resumed upon detection of the attachment of the memory card to the camera. If a predetermined period has elapsed since the power supply is suspended while the memory card is not attached from the camera, the main switch is automatically turned off.

6 Claims, 4 Drawing Sheets

ELECTRONIC CAMERA

BACKGROUND OF THE INVENTION

1. Field of the Invention

The present invention relates generally to an electronic camera, and more particularly to an electronic camera that uses an external storage medium, which is detachably connected to a body of the electronic camera.

2. Description of Related Art

In a conventional digital camera using an external storage medium such as a memory card, which is detachably connected to a body of the camera, captured image data is temporarily stored in the memory card, and then the image data is transferred to a storage device with a larger capacity than the memory card (e.g. a hard disk of a personal computer). Then, the memory card is cleared so that it can be repeatedly used.

In such a digital camera, the memory card is detached from the body of the camera in order to transfer the captured image data to the storage device. In this case, it is necessary to turn off a power switch of the camera before detaching the memory card from the body of the camera in order to protect the memory card and the image data therein. This prevents the waste of power in the camera since the camera is never used while the memory card is detached from the body of the camera. In order to capture images again, the memory card must be attached to the body of the camera. Since the power switch of the camera is OFF at this time, the power switch of the camera must be turned on after the memory card is attached to the body of the camera. Likewise, to exchange memory cards, an operator has to turn off the power switch of the camera before detaching one memory card from the body of the camera, and has to turn on the power switch after attaching another memory card to the body of the camera. It is troublesome to turn off and on the power switch of the camera every time the external storage medium is detached and attached.

Japanese Patent Provisional Publication No. 8-96493 discloses a control unit for an external storage medium. This control unit suspends the drive of a drive control unit for the external storage medium and the power supply to the drive control unit when a lid of an external storage medium housing is opened, so that the external storage medium is protected. This control unit, however, does not resume the power supply.

SUMMARY OF THE INVENTION

The present invention has been developed in view of the above-described circumstances, and has as its subject the provision of an electronic camera that is able to automatically suspend the power supply when the external storage medium is detached, and automatically resumes the power supply when the external storage medium is attached. This electronic camera eliminates the necessity of operating the power switch when the external storage medium is detached and attached.

To achieve the above-mentioned subject, the present invention is directed to an electronic camera comprising: an imaging part for driving an imaging device to capture image data representing an image of a subject; an external storage medium interface for writing the image data captured by the imaging part into an external storage medium; a connector for detachably connecting the external storage medium to the external storage medium interface; a power supply part for supplying power to components of the camera; a master switch for turning on and off the power supply part; a detector for detecting detachment and attachment of the external storage medium from and to the connector; and a controller for suspending a power supply from the power supply part when the detector detects the detachment of the external storage medium from the connector, and for resuming the power supply from the power supply part when the detector detects the attachment of the external storage medium to the connector.

According to the present invention, the power supply is suspended upon detection of the detachment of the external storage medium while the master switch is ON. This protects the external storage medium and the data therein, and reduces the waste of power in the camera while the external storage medium is detached from the camera. The power supply is resumed upon detection of the attachment of the external storage medium to the camera.

The power supply from the power supply part is preferably suspended and resumed under control of the controller to at least one of the following: all the components supplied with power from the power supply part except for the detector and the controller; the external storage medium interface; the connector; and the external storage medium.

The controller may suspend the power supply from the power supply part when the detector detects that the external storage medium starts being detached from the connector while the external storage medium is still connected. Alternately, the controller may suspend the power supply from the power supply part when the detector detects that the external storage medium is completely detached from the connector and the external storage medium is disconnected.

The controller may resume the power supply from the power supply part when the detector detects that the external storage medium is completely attached to the connector and the external storage medium is connected. Alternately, the controller may resume the power supply from the power supply part when the detector detects that the external storage medium starts being attached to the connector while the external storage medium is not connected yet.

The detector may detect the detachment and attachment of the external storage medium by detecting that the external storage medium is removed from and inserted into a chamber, which contains the external storage medium.

The detector may detect the detachment and attachment of the external storage medium by detecting operations of a chamber mechanism, which discharges the external storage medium from the chamber and receives the external storage medium into the chamber.

The detector may detect the detachment and attachment of the external storage medium by detecting that a lid of the chamber is opened and closed.

The controller preferably has a timer for measuring elapsed time since the power supply from the power supply part is suspended, and the controller preferably turns off the master switch when the elapsed time reaches a predetermined time while the detector does not detect the attachment of the external storage medium.

BRIEF DESCRIPTION OF THE DRAWINGS

The nature of this invention, as well as other subjects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
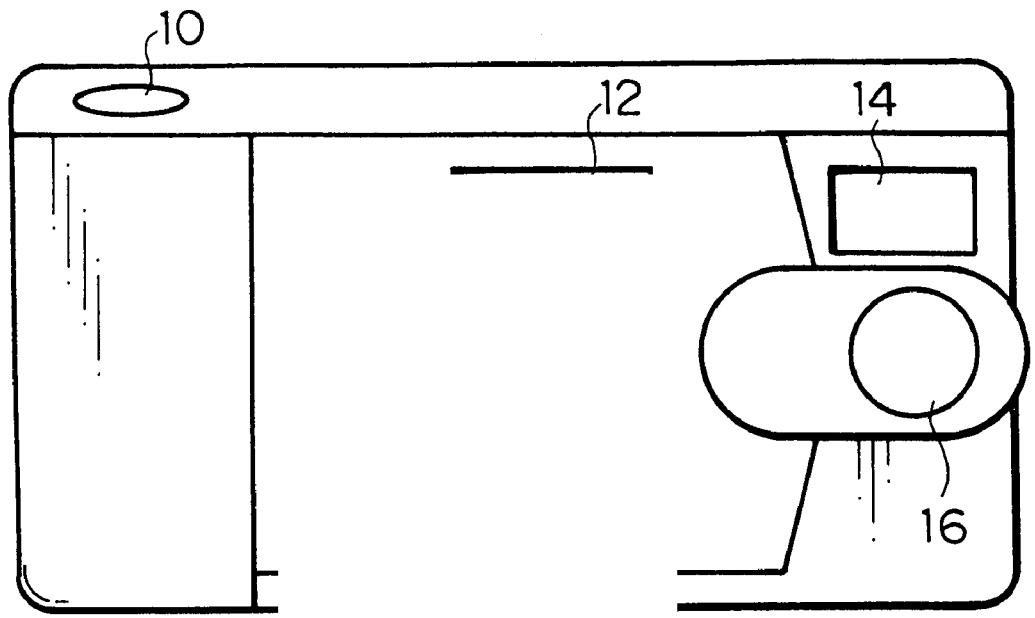
FIG. 1 is a front view showing a preferred embodiment of an electronic camera according to the present invention.
Figure 2:
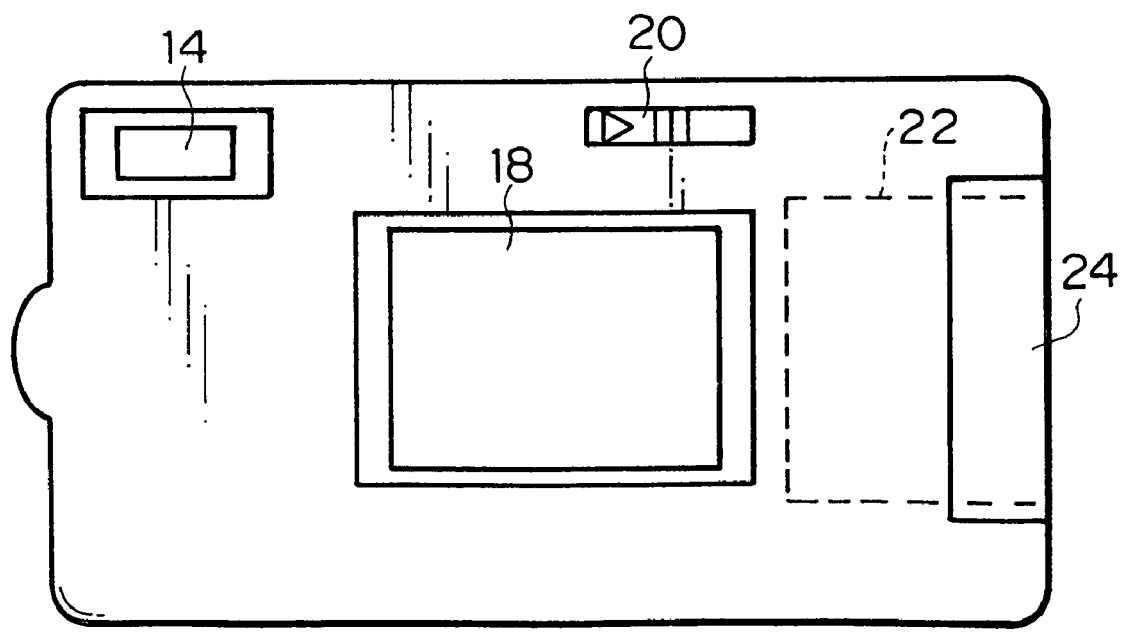
FIG. 2 is a back view showing the electronic camera in FIG. 1.

FIGS. 1 and 2 are a front view and a back view, respectively, showing a preferred embodiment of an electronic camera according to the present invention.

In FIG. 1, reference numeral 10 is a release button, 12 is an electric flash, 14 is an optical viewfinder, and 16 is a taking lens. In FIG. 2, reference numeral 18 is a liquid crystal display (LCD) that can be used as a viewfinder, 20 is a power switch, 22 is a memory card chamber, and 24 is a lid of the memory card chamber 22.

Figure 3:
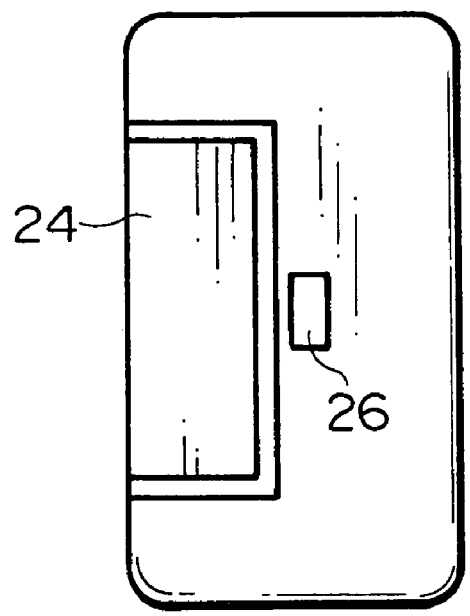
FIG. 3 is a right side view showing the state wherein a lid of a memory card chamber is closed.
Figure 4:
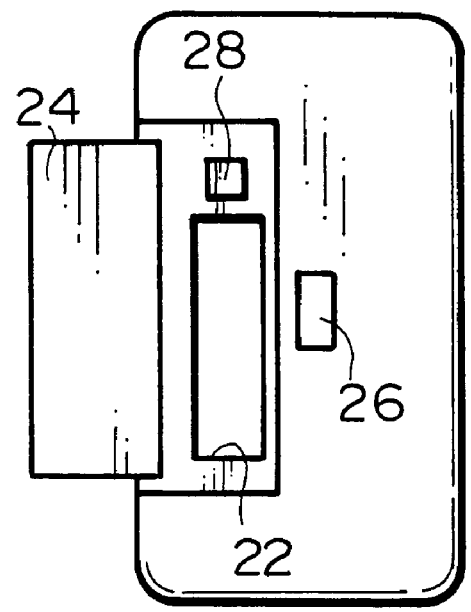
FIG. 4 is a right side view showing the state wherein the lid of the memory card chamber is open.

FIGS. 3 and 4 are right side views of FIG. 2. FIG. 3 shows the state wherein the lid 24 is closed, and FIG. 4 shows the state wherein the lid 24 is opened. In FIGS. 3 and 4, reference numeral 26 is a lid switch for detecting whether the lid 24 is opened or closed, and 28 is a memory card detachment button of a chamber mechanism, which discharges a memory card 44 (see FIG. 5) from the memory card chamber 22 and receives the memory card 44 into the memory card chamber 22. When the memory card 44 is inserted into the memory card chamber 22, the memory card detachment button 28 projects. If an operator presses the memory card detachment button 28 in this state, the memory card 44 partially projects from the memory card chamber 22 to facilitate the removing of the memory card 44.

Figure 5:
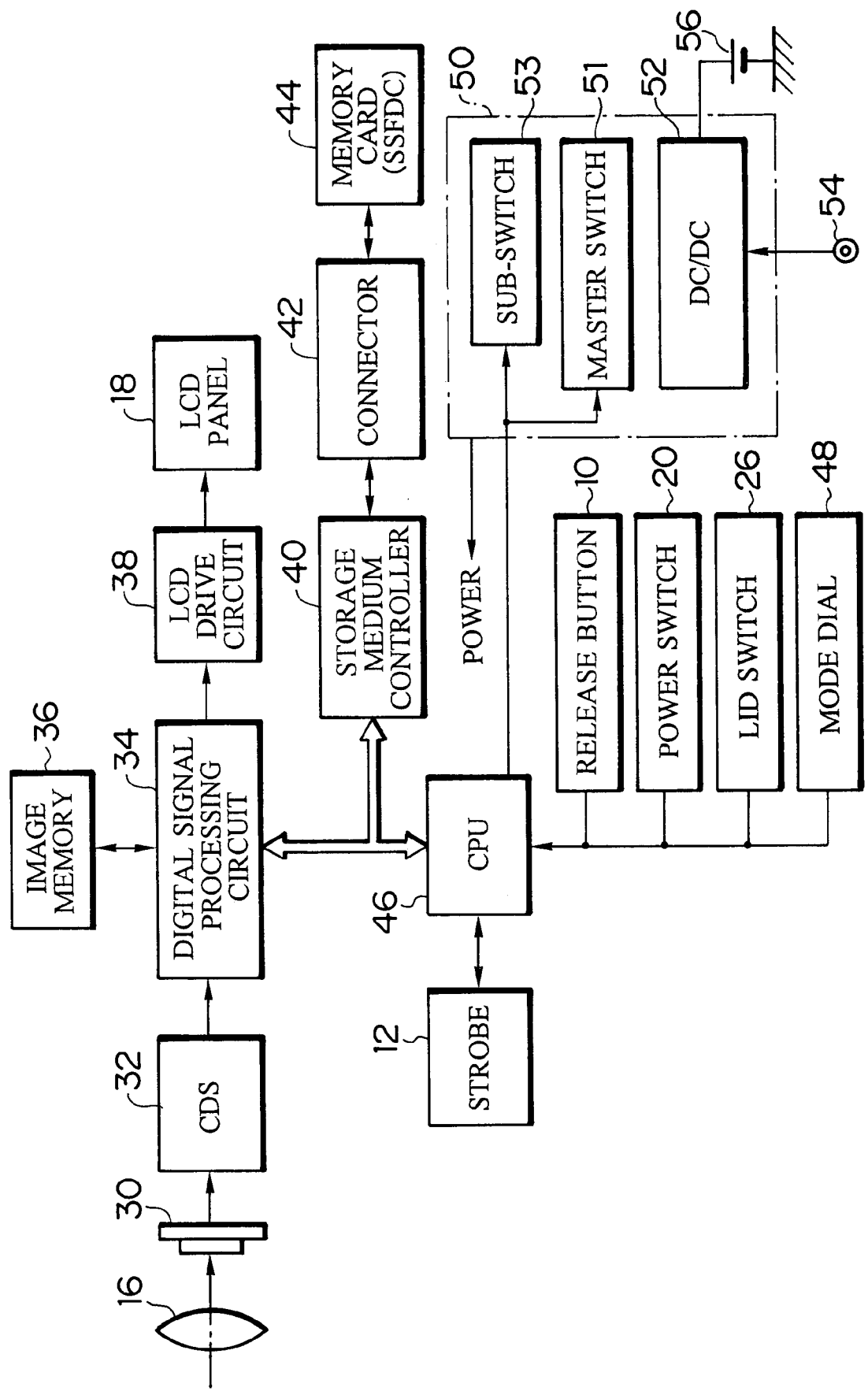
FIG. 5 is a block diagram showing the interior structure of the electronic camera according to the present invention.

FIG. 5 is a block diagram showing the interior structure of the electronic camera.

The electronic camera is a digital camera, which records still images in an external storage medium or the memory card 44 in response to the operation of the release button 10.

An image of a subject is formed on a light-receiving surface of a charge coupled device (CCD) 30 through the taking lens 16. The CCD 30 converts image light, which is formed on the light receiving surface, into signal electric charges corresponding to the quantity of the image light. The signal electric charges are sequentially read as corresponding voltage signals (image signals), and they are transmitted to a CDS circuit 32.

The CDS circuit 32 includes a CDS clamp, a gain control amplifier and an A/D converter. The CDS clamp sample-holds the image signals, which are read from the CCD 30, for each pixel. Then, the gain control amplifier amplifies the image signals, and the A/D converter converts the image signals into RGB digital signals, and the RGB digital signals are transmitted to a digital signal processing circuit 34.

The digital signal processing circuit 34 includes a white balance adjusting circuit, a YC signal generating circuit, a compression/expansion circuit. The digital signal processing circuit 34 adjusts the white balance of the RGB digital signals, converts the RGB digital signals into luminance signals Y and chroma signals C (YC signals), compresses the YC signals, and expands the compressed data to the YC signals.

An LCD drive circuit 38 generates RGB signals and pulses to drive the LCD 18 according to the YC signals, which are inputted from the digital signal processing circuit 34. The LCD drive circuit 38 transmits the RGB signals and the pulses to the LCD 18 to display an image on the LCD 18.

A storage medium controller 40 records the image data compressed by the digital signal processing circuit 34 in the memory card 44, which is connected to the storage medium controller 40 through a connector 42. The storage medium controller 40 reads the image data from the memory card 44, and transmits the read image data to the digital signal processing circuit 34.

A CPU 46 supervises the circuits in response to the operation of the release button 10, the power switch 20, the lid switch 26 and a mode dial 48. The details of the CPU 46 will be described later.

A power supply part 50 has a DC/DC converter 52, a master switch 51 and a sub-switch 53. The power supply part 50 is supplied with the power from a battery 56, which is detachably mounted in the camera body, or from outside through a power supply terminal 54.

If the operator slides the power switch 20 to the right in FIG. 2 with the finger when the master switch 51 is OFF, the CPU 46 detects that the power switch 20 has been operated, and the CPU 46 turns on the master switch 51. The state wherein the master switch 51 is ON is referred to as a "power-on mode." In the power-on mode, the power supply part 50 supplies the power with appropriate voltage to each circuit in the camera to activate each circuit. If the operator releases the power switch 20 after operating the power switch 20, the power switch 20 returns to the original position.

If the operator slides the power switch 20 to the right in FIG. 2 with the finger in the power-on mode, the CPU 46 detects that the power switch 20 has been operated, and the CPU 46 turns off the master switch 51. The state wherein the master switch 51 is OFF is referred to as a "power-off mode." In the power-off mode, the power supply part 50 only supplies the power for maintaining the minimum essential functions of the CPU 46.

The sub-switch 53 is normally ON in the power-on mode. If the CPU 46 turns off the sub-switch 53 in the power-on mode, the power supply part 50 stops supplying the power to the storage medium controller 40, the connector 42 and the memory card 44 that is connected through the connector 42.

If an image capturing mode is selected with the mode dial 48 in the power-on mode, the CPU 46 transmits a command to the digital signal processing circuit 34 in order to display a moving image on the LCD 18. Accordingly, the digital signal processing circuit 34 sequentially receives the RGB signals at a predetermined frame rate through the CCD 30 and the CDS circuit 32, and generates signals suitable for display on the LCD 18. Then, the digital signal processing circuit 34 outputs the signals to the LCD drive circuit 38. The LCD drive circuit 38 displays the moving image on the LCD 18 in accordance with the signals inputted from the digital signal processing circuit 34.

In this case, the LCD 18 can be used as the electronic finder since it shows the moving image. The operator can determine the composition of the image while looking at the image on the LCD 18. It is possible to suspend the power supply to the LCD 18, etc. by operating a display switch (not shown) to reduce the consumption of power. In this case, the operator uses the optical viewfinder 14 to determine the composition of the image.

When the release button 10 is pressed, the digital signal processing circuit 34 receives the RGB signals of one frame for storage through the CCD 30 and the CDS circuit 32. Then, the digital signal processing circuit 34 converts the RGB signals into the YC signals and stores the YC signals in an image memory 36. Thereafter, the digital signal processing circuit 34 compresses the YC signals in a predetermined form to record them in the memory card 44 through the storage medium controller 40 and the connector 42. The electric flash 12 flashes according to a command from the CPU 46 when the subject brightness is low or when a compulsory light-emitting switch (not shown) is ON.

If a reproduction mode is selected with the mode dial 48, the CPU 46 transmits a command to the digital signal processing circuit 34 in order to display a reproduced image on the LCD 18. Accordingly, the digital signal processing circuit 34 reads the image data from the memory card 44 through the storage medium controller 40 and the connector 42. Then, the digital signal processing circuit 34 expands the read image data, and converts the image data into the YC signals, and stores the YC signals in the image memory 36. Thereafter, the digital signal processing circuit 34 continuously reads the YC signals from the image memory 36 and outputs them to the LCD drive circuit 38 to display the image on the LCD 18. Consequently, the still image (the reproduced image), which is stored in the memory card 44, is displayed on the LCD 18. Alternatively, the reproduced image may also be displayed on a television, which is connected through a video output terminal (not shown), etc.

Figure 6:
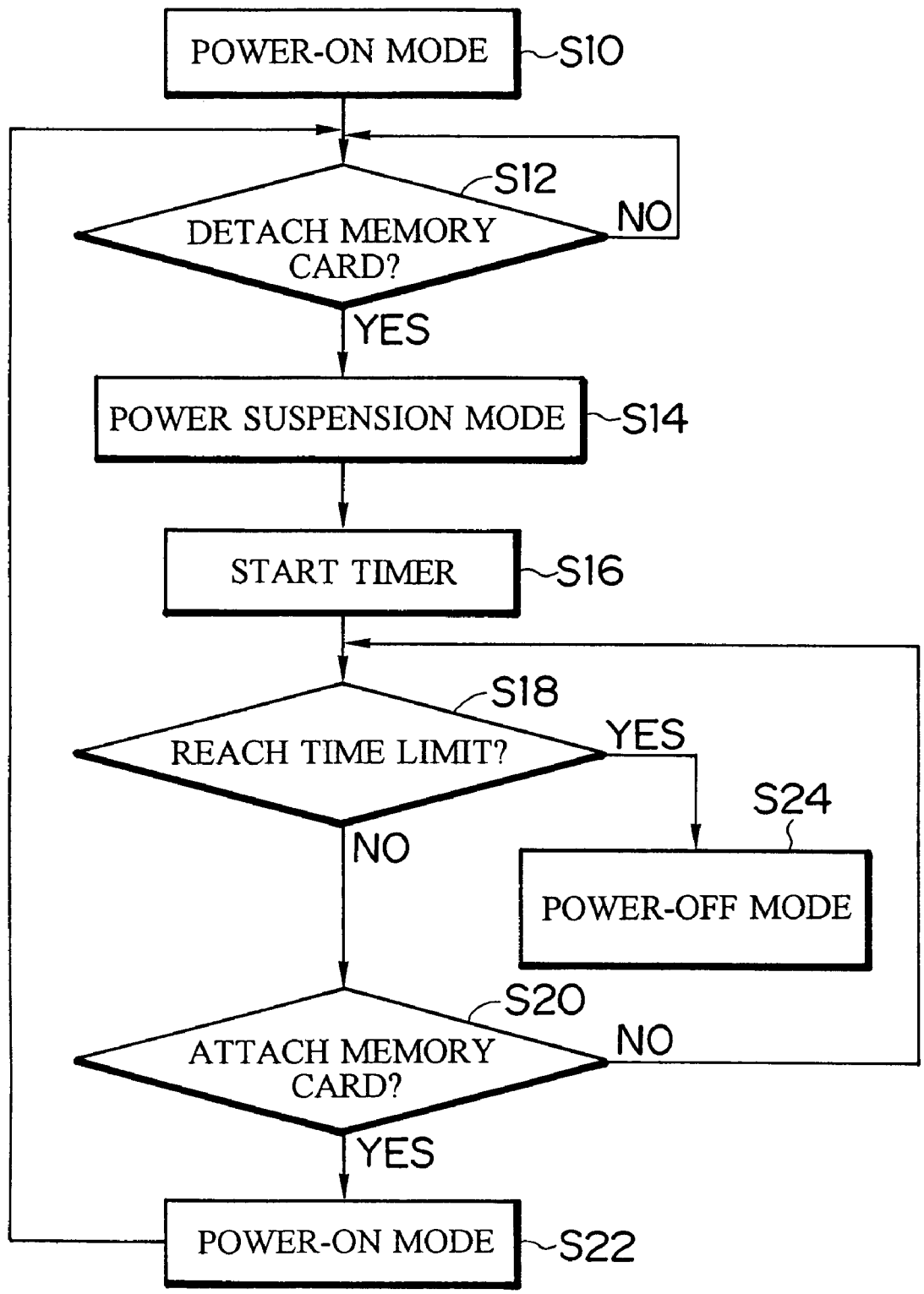
FIG. 6 is a flow chart showing the steps for controlling the power supply when the memory card is attached or detached.

With reference to the flow chart of FIG. 6, a description will now be given of a procedure for controlling the power supply when the memory card 44 is detached and attached in the power-on mode.

This procedure starts at the power-on mode (S10). In the power-on mode, the CPU 46 determines whether the memory card 44 is going to be detached (S12). The determination is based on whether the lid switch 26 detects that the lid 24 of the memory card chamber 22 is opened in the state wherein the connector 42 connects with the memory card 44. The CPU 46 determines whether the connector 42 connects with the memory card 44 based on whether a predetermined terminal of the connector 42 connects with a ground terminal of the memory card 44.

If the lid switch 26 detects that the lid 24 of the memory card chamber 22 is opened at S12, the CPU 46 determines that the memory card 44 is going to be detached, and the CPU 46 turns off the sub-switch 53 (S14). Thus, the CPU 46 suspends the power supply from the power supply part 50 to the storage medium controller 40, the connector 42 and the memory card 44 that is still connected through the connector 42. The state wherein the CPU 46 is suspending the power supply from the power supply part 50 is referred to as a "power suspension mode." Then, the memory card 44 is detached.

The CPU 46 starts a timer at the same time as the start of the power-suspension mode (S16). The CPU 46 determines whether elapsed time has reached a predetermined time limit (S18). If the elapsed time has not reached the predetermined time limit, the CPU 46 determines whether the memory card 44 is attached (S20). The CPU 46 determines whether the memory card 44 is attached by detecting that the lid 24 is closed with the lid switch 26 after detecting that the connector 42 connects with the memory card 44. If the CPU 46 determines that the memory card 44 is attached at S20, the CPU 46 turns on the sub-switch 53 (S22). Thus, the CPU 46 resumes the power supply from the power supply part 50 to the storage medium controller 40, the connector 42 and the memory card 44 connected through the connector 42. Then, the procedure returns to S12.

If the CPU 46 determines that the elapsed time has reached the predetermined time limit at S18, the CPU 46 turns off the master switch 51 to enter the power-off mode (S24) as in the case where the master switch 51 is turned off in response to the operation of the power switch 20. In the power-off mode, the master switch 51 is not turned on regardless of the operation of the lid switch 26 unless the power switch 20 is operated. The predetermined time limit in the power suspension mode is shorter than a predetermined time limit for an automatic power-off control, in which the CPU 46 turns off the master switch 51 when no operation part of the camera has operated for the predetermined time limit. Moreover, the predetermined time limit in the power suspension mode must be sufficient for exchanging the memory cards 44.

In this embodiment, the attachment and detachment of the memory card 44 are detected according to the operation of the lid switch 26, but the present invention should not be limited to this. For example, it is possible to detect the attachment and detachment of the memory card 44 according to the operation of a switch that detects the operation of the chamber mechanism including the memory card detachment button 28. Alternatively, it is possible to detect the attachment and detachment of the memory card 44 according to the operation of a switch that directly detects the presence of the memory card 44.

When the memory card 44 is detached, it is preferable to suspend the power supply to the memory card 44 before the memory card 44 is separated from the connector 42, that is while the memory card 44 still connects with the connector 42, in order to protect the memory card 44 and the data therein. In this embodiment, the CPU 46 enters the power suspension mode as soon as it detects that the detachment of the memory card 44 is started. The present invention, however, should not be restricted to this. For some types of external storage media, the CPU 46 may enter the power suspension mode after detecting that the external storage medium is separated from the connector.

When the memory card 44 is attached, it is preferable to resume the power supply to the memory card 44 after detecting that the memory card 44 has been connected through the connector 42. The present invention, however, should not be restricted to this. For some types of external storage media, as soon as the CPU 46 detects that the attachment of the external storage medium to the connector 42 starts, the CPU 46 may enter the power-on mode to get ready for the connection.

In this embodiment, the power supply part 50 continues supplying the power to components other than the storage medium controller 40 and the connector 42 (and the memory card 44 connected through the connector 42) in the power suspension mode in order to restart capturing the image just after the memory card 44 is exchanged to another one. The present invention, however, should not be restricted to this. For example, in the power suspension mode, it is possible to suspend the power supply from the power supply part 50 to other components that can be activated as soon as the power supply is resumed even if the power supply is suspended. Moreover, the CPU 46 may turn off and on the master switch 51 to enter the power suspension mode and to return the power-on mode. This eliminates the necessity of providing the sub-switch 53.

In this embodiment, the present invention is applied to the electronic camera that records the still image in the external storage medium, but the present invention may also be applied to an electronic camera that records a moving image in the external storage medium.

As set forth hereinabove, the electronic camera of the present invention automatically suspends the power supply when the external storage medium is detached, and automatically resumes the power supply after the external storage medium is attached. Therefore, the operator does not have to operate the power switch when the external storage medium is detached and attached, and it is easy to detach and attach the external storage medium. If the external storage medium is detached by mistake while the data is written in/read from the external storage medium, it is possible to protect the data in the external storage medium. It is also possible to reduce the waste of power in the camera while the external storage medium is detached from the camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera comprising:
    an imaging part for driving an imaging device to capture image data representing an image of a subject;
    an external storage medium interface for writing the image data captured by the imaging part into an external storage medium;
    a connector for detachably connecting the external storage medium to the external storage medium interface;
    an external storage medium chamber for receiving the external storage medium connected to the external storage medium interface, the external storage medium chamber having an opening through which the external storage medium is received;
    a lid for closing the opening of the external storage medium chamber;
    a power supply part for supplying power to components of the camera;
    a master switch for turning on and off the power supply part, wherein the master switch is a switch to be operated manually;
    a detector for detecting that the lid is opened and closed; and
    a controller for performing suspension of a power supply from the power supply part when the detector detects that the lid is opened while the master switch is on, and for performing resumption of the power supply from the power supply part when the detector detects that the lid is closed during the suspension of the power supply, wherein when the detector detects that the lid is opened while the master switch is turned on, the controller suspends the power supply from the power supply part to at least the external storage medium while maintaining the power supply from the power supply part to the detector while the master switch is on, wherein:
    the controller has a timer for measuring elapsed time since the power supply from the power supply part is suspended, and the controller turns off the master switch when the elapsed time reaches a predetermined time shorter than a time for an automatic power-off control while the detector does not detect that the lid is closed.

2. The electronic camera as defined in claim 1, wherein the power supply from the power supply part is suspended and resumed under control of the controller to at least one of the following: all the components supplied with power from the power supply part except for the detector and the controller; the external stroage medium interface, the connector; and the external storage medium.

3. An electronic camera comprising:
    an imaging part for driving an imaging device to capture image data representing an image of a subject;
    a connector for detachably connecting to an external storage medium;
    an external storage medium interface for writing the image data captured by the imaging part into the external storage medium through the connector;
    a power supply part for supplying power to components of the camera;
    a master switch for turning on and off the power supply part, wherein the master switch is a switch to be operated manually;
    a chamber for containing the external storage medium, the connector being disposed in the chamber;
    a lid for closing the opening of the chamber; and
    a chamber mechanism for discharging the external storage medium from the chamber and receiving the external storage medium into the chamber;
    a detector for detecting whether the connector is electrically connected to the external storage medium, and for detecting an operation relating to detachment of the external storage medium while the connector is electrically connected to the external storage medium; and
    a controller for performing suspension of a power supply from the power supply part when the detector detects the operation relating to the detachment of the external storage medium from the connector while the master switch is on, and for performing resumption of the power supply from the power supply part when the detector detects that the connector is electrically connected to the external storage medium during the suspension of the power supply, wherein the operation relating to the detachment of the external storage medium is the opening of a lid, and wherein when the detector detects that the lid is opened while the master switch is turned on, the controller suspends the power supply from the power supply part to at least the external storage medium while maintaining the power supply from the power supply part to the detector while the master switch is on, wherein:
    the controller has a timer for measuring elapsed time since the power supply from the power supply part is suspended, and the controller turns off the master switch when the elapsed time reaches a predetermined time shorter than a time for an automatic power-off control while the detector does not detect that the connector is electrically connected to the external storage medium.

4. The electronic camera as defined in claim 3, wherein the power supply from the power supply part is suspended and resumed under control of the controller to at least one of the following: all the components supplied with power from the power supply part except for the detector and the controller; the external storage medium interface; the connector; and the external storage medium.

5. An electronic camera comprising:
    an imaging part for driving an imaging device to capture image data representing an image of a subject;
    a connector for detachably connecting to an external storage medium;

an external storage medium interface for writing the image data captured by the imaging part into the external storage medium through the connector;

a power supply part for supplying power to components of the camera;

a master switch for turning on and off the power supply part, wherein the master switch is a switch to be operated manually;

a chamber for containing the external storage medium, the connector being disposed in the chamber; and a chamber mechanism for discharging the external storage medium from the chamber and receiving the external storage medium into the chamber;

a detector for detecting a first operation relating to detachment of the external storage medium while the connector is electrically connected to the external storage medium, and a second operation relating to attachment of the external storage medium, wherein the detector detects the second operation by detecting an operation of the chamber mechanism; and a controller for performing suspension of a power supply from the power supply part when the detector detects the first operation while the master switch is on, and for performing resumption of the power supply from the power supply part when the detector detects the second operation during the suspension of the power supply, wherein the operation of the chamber mechanism is the opening of a lid for closing the opening of a chamber, wherein when the detector detects that the lid is opened while the master switch is turned on, the controller suspends the power supply from the power supply part to at least the external storage medium while maintaining the power supply from the power supply part to the detector while the master switch is on, wherein:

the controller has a timer for measuring elapsed time since the power supply from the power supply part is suspended, and the controller turns off the master switch when the elapsed time reaches a predetermined time shorter than a time for an automatic power-off control while the detector does not detect the second operation.

6. The electronic camera as defined in claim 5, wherein the power supply from the power supply part is suspended and resumed under control of the controller to at least one of the following: all the components supplied with power from the power supply part except for the detector and the controller; the external storage medium interface; the connector; and the external storage medium.

* * * * *